US011106923B2

(12) United States Patent
Shin et al.

(10) Patent No.: US 11,106,923 B2
(45) Date of Patent: Aug. 31, 2021

(54) METHOD OF CHECKING SURROUNDING CONDITION OF VEHICLE

(71) Applicant: LG Electronics Inc., Seoul (KR)

(72) Inventors: Dongheon Shin, Seoul (KR); Taekwon Kang, Seoul (KR); Sunyup Kim, Seoul (KR); Hyunsang Park, Seoul (KR)

(73) Assignee: LG Electronics Inc., Seoul (KR)

( * ) Notice: Subject to any disclaimer, the term of this patent is extended or adjusted under 35 U.S.C. 154(b) by 94 days.

(21) Appl. No.: 16/545,605

(22) Filed: Aug. 20, 2019

(65) Prior Publication Data

US 2019/0370571 A1 Dec. 5, 2019

(30) Foreign Application Priority Data

Jul. 19, 2019 (KR) .................. 10-2019-0087640

(51) Int. Cl.
| | |
|---|---|
| *G06K 9/00* | (2006.01) |
| *G06K 9/32* | (2006.01) |
| *H04L 29/08* | (2006.01) |
| *G06T 7/70* | (2017.01) |

(52) U.S. Cl.
CPC ....... *G06K 9/00805* (2013.01); *G06K 9/3233* (2013.01); *G06T 7/70* (2017.01); *H04L 67/12* (2013.01); *H04L 67/327* (2013.01); *G06T 2207/30252* (2013.01)

(58) Field of Classification Search
CPC ............ G06K 9/00805; G06K 9/3233; G06K 9/00791; H04L 67/327; H04L 67/12; H04L 67/34; G06T 7/70; G06T 2207/30252

See application file for complete search history.

(56) References Cited

U.S. PATENT DOCUMENTS

| 10,868,740 | B2 * | 12/2020 | Eranko ............... G08G 5/0039 |
| 2007/0028286 | A1 * | 2/2007 | Greene ............... H04N 19/164 |
| | | | 725/135 |
| 2019/0286989 | A1 * | 9/2019 | Wang .................. G06N 3/0454 |

FOREIGN PATENT DOCUMENTS

KR 1020100111543 10/2010

\* cited by examiner

*Primary Examiner* — Christopher M Brandt
(74) *Attorney, Agent, or Firm* — Fish & Richardson P.C.

(57) ABSTRACT

Disclosed is a method of checking a surrounding condition of a vehicle. The method of checking a surrounding condition of a vehicle may comprise identifying at least one connectable client in the vehicle, communicating with the identified client to verify performance of the client based on a determination criterion of the performance of the client, assigning an algorithm corresponding to the client based on the verified performance of the client, and checking a surrounding condition of the vehicle based on information obtained from the client as a result of processing image data according to the algorithm in the case of acquiring the image data through a sensor of the vehicle. The vehicle of the present invention can be connected to an artificial intelligence module, an unmanned aerial vehicle (UAV), a robot, an augmented reality (AR) device, a virtual reality (VR) device, a device related to 5G services and so on.

20 Claims, 12 Drawing Sheets

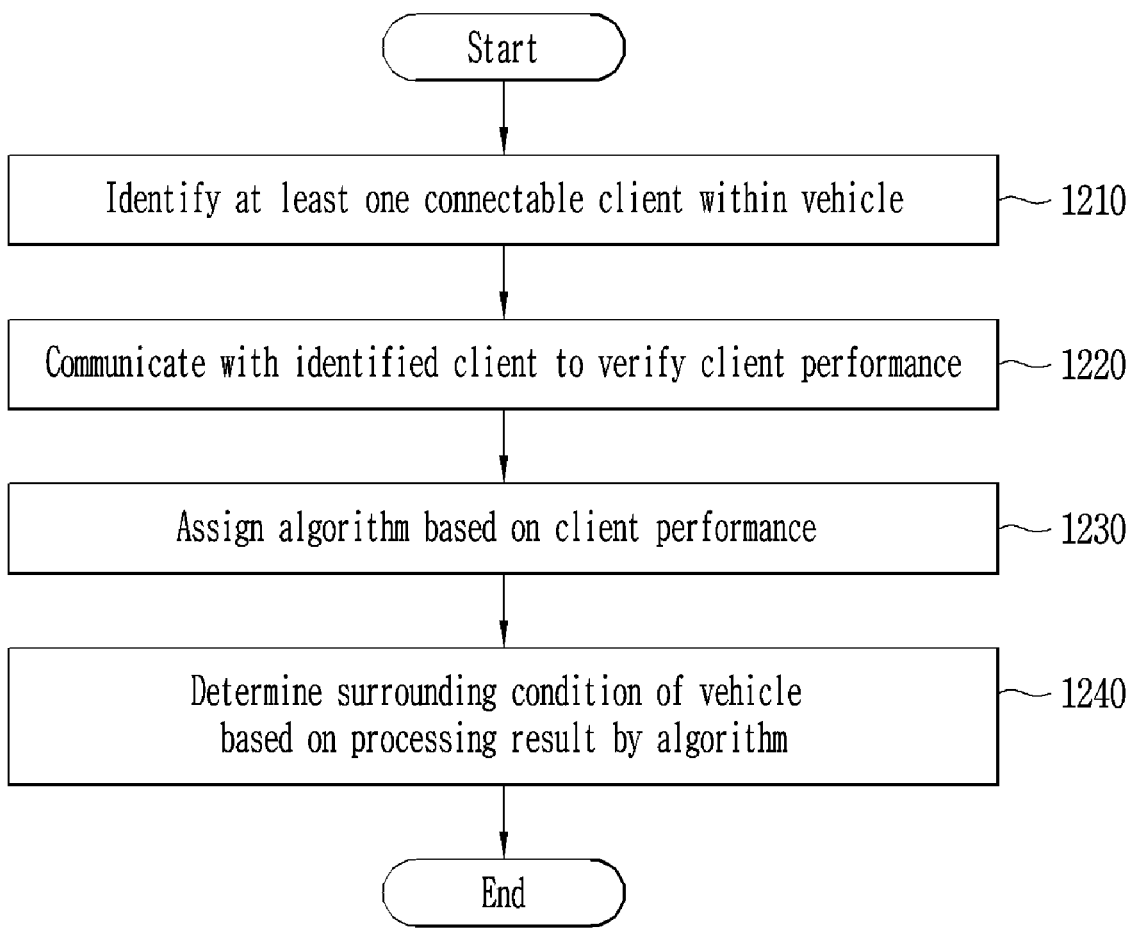

METHOD OF CHECKING SURROUNDING CONDITION OF VEHICLE

CROSS-REFERENCE TO RELATED APPLICATION

This application is based on and claims priority under 35 U.S.C. § 119(a) to Korean Patent Application No. 10-2019-0087640, which was filed on Jul. 19, 2019, the disclosure of which is incorporated herein in its entirety by reference.

BACKGROUND

1. Field

The present disclosure relates to a method in which a computing device checks a surrounding condition of a vehicle and provides related information according to a result of the check, and more particularly to a method of checking a surrounding condition of a vehicle by sharing image data between the vehicle and a client.

2. Description of the Related Art

The types of algorithms that can be driven may depend on the performance of ADAS (Advanced Driver Assistance System) module installed in the vehicle. Or the types of algorithms that can be driven may be limited if the performance of the mounted ADAS module is poor. If the image data is shared between the vehicle and the client and the surrounding condition of the vehicle is determined based on the recognition result of the image data by the client, the vehicle can recognize the surrounding condition accurately despite the poor performance of the ADAS module mounted on the vehicle. Therefore, there is a need for a technique for sharing the image data between the vehicle and the client to check the surrounding condition of the vehicle.

SUMMARY

Disclosed embodiments disclose a technique of sharing image data between a vehicle and a client and checking a surrounding condition of the vehicle based on a recognition result of the image data by the client. The objective of the present embodiment is not limited to the above-mentioned, and other objectives can be deduced from the following embodiments.

A method of checking a surrounding condition of a vehicle according to an embodiment of the present invention may comprise identifying at least one connectable client in the vehicle, communicating with the identified client to verify performance of the client based on a determination criterion of the performance of the client, assigning an algorithm corresponding to the client based on the verified performance of the client, and checking a surrounding condition of the vehicle based on information obtained from the client as a result of processing image data according to the algorithm in the case of acquiring the image data through a sensor of the vehicle.

A vehicle according to another embodiment of the present invention may comprise a sensor configured to acquire image data, a controller configured to assign a corresponding algorithm to a client based on performance of the client verified based on a determination criterion according to a communication performed with the client in the vehicle, and a processor configured to check a surrounding condition of the vehicle based on information obtained from the client as a result of processing the image data acquired through the sensor according to the algorithm.

The details of other embodiments are included in the detailed description and drawings.

According to the embodiments of the present invention, one or more of the following effects are obtained.

First, even if the performance of the ADAS module mounted on the vehicle is not good, it is possible to determine the surrounding condition of the vehicle based on the recognition result of the image data from the client by sharing the image data between the vehicle and the connectable client.

Second, even if the performance of the client connectable to the vehicle is poor, the surrounding condition of the vehicle can be determined based on the recognition result from the client for a region of interest, which is a part of the image data.

Third, since the algorithm is assigned based on the performance of the client, the surrounding condition of the vehicle can be more accurately determined by integrating the recognition results by the algorithm.

Fourth, when the sensor of the vehicle senses the environment around the vehicle, it is possible to more accurately determine the surrounding condition of the vehicle by applying a weight to the processing result of the algorithm suitable for the environment.

The advantageous effects of the invention are not limited to the above-mentioned, and other advantageous effects which are not mentioned can be clearly understood by those skilled in the art from the claims.

BRIEF DESCRIPTION OF THE DRAWINGS

The above and other aspects, features, and advantages of certain embodiments will be more apparent from the following detailed description taken in conjunction with the accompanying drawings, in which:

FIG. 12 illustrates a flowchart of a method of determining a surrounding condition of a vehicle performed by the vehicle.

DETAILED DESCRIPTION

Figure 1:
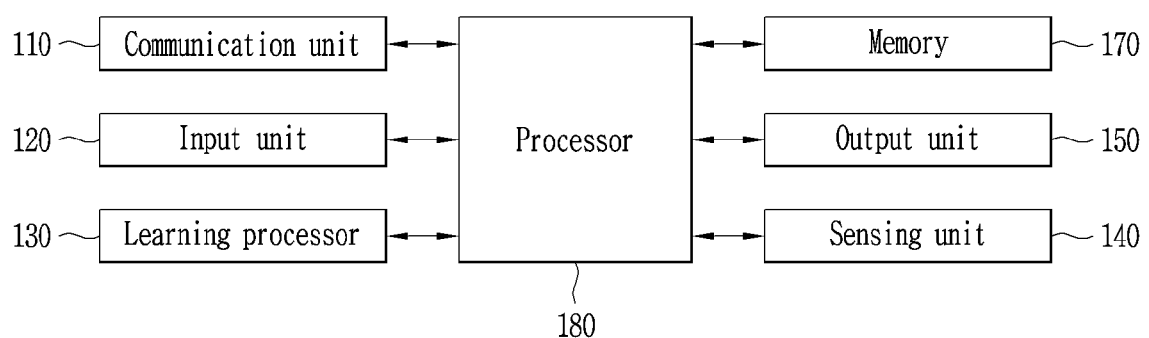
FIG. 1 illustrates an AI device 100 according to an embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Exemplary embodiments of the present invention are described in detail with reference to the accompanying drawings. Detailed descriptions of technical specifications well-known in the art and unrelated directly to the present invention may be omitted to avoid obscuring the subject matter of the present invention. This aims to omit unnecessary description so as to make clear the subject matter of the present invention. For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers. Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification. It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions which are executed on the computer or other programmable apparatus provide steps for implementing the functions/acts specified in the flowcharts and/or block diagrams. Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions. According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card. In addition, a controller mentioned in the embodiments may include at least one processor that is operated to control a corresponding apparatus.

Artificial Intelligence refers to the field of studying artificial intelligence or a methodology capable of making the artificial intelligence. Machine learning refers to the field of studying methodologies that define and solve various problems handled in the field of artificial intelligence. Machine learning is also defined as an algorithm that enhances the performance of a task through a steady experience with respect to the task.

An artificial neural network (ANN) is a model used in machine learning, and may refer to a general model that is composed of artificial neurons (nodes) forming a network by synaptic connection and has problem solving ability. The artificial neural network may be defined by a connection pattern between neurons of different layers, a learning process of updating model parameters, and an activation function of generating an output value.

The artificial neural network may include an input layer and an output layer, and may selectively include one or more hidden layers. Each layer may include one or more neurons, and the artificial neural network may include a synapse that interconnects neurons. In the artificial neural network, each neuron may output input signals that are input through the synapse, weights, and the value of an activation function concerning deflection.

Model parameters refer to parameters determined by learning, and include weights for synaptic connection and deflection of neurons, for example. Then, hyper- parameters mean parameters to be set before learning in a machine learning algorithm, and include a learning rate, the number of repetitions, the size of a mini-batch, and an initialization function, for example.

It can be said that the purpose of learning of the artificial neural network is to determine a model parameter that minimizes a loss function. The loss function maybe used as an index for determining an optimal model parameter in a learning process of the artificial neural network.

Machine learning may be classified, according to a learning method, into supervised learning, unsupervised learning, and reinforcement learning.

The supervised learning refers to a learning method for an artificial neural network in the state in which a label for learning data is given. The label may refer to a correct answer (or a result value) to be deduced by an artificial neural network when learning data is input to the artificial neural network. The unsupervised learning may refer to a learning method for an artificial neural network in the state in which no label for learning data is given. The reinforcement learning may mean a learning method in which an agent defined in a certain environment learns to select a behavior or a behavior sequence that maximizes cumulative compensation in each state.

Machine learning realized by a deep neural network (DNN) including multiple hidden layers among artificial neural networks is also called deep learning, and deep learning is a part of machine learning. Hereinafter, machine learning is used as a meaning including deep learning.

The term "autonomous driving" refers to a technology of autonomous driving, and the term "autonomous vehicle" refers to a vehicle that travels without a user's operation or with a user's minimum operation.

For example, autonomous driving may include all of a technology of maintaining the lane in which a vehicle is driving, a technology of automatically adjusting a vehicle speed such as adaptive cruise control, a technology of causing a vehicle to automatically drive along a given route, and a technology of automatically setting a route, along which a vehicle drives, when a destination is set.

A vehicle may include all of a vehicle having only an internal combustion engine, a hybrid vehicle having both an internal combustion engine and an electric motor, and an electric vehicle having only an electric motor, and may be meant to include not only an automobile but also a train and a motorcycle, for example.

At this time, an autonomous vehicle may be seen as a robot having an autonomous driving function.

FIG. 1 illustrates an AI device 100 according to an embodiment of the present disclosure.

AI device 100 may be realized into, for example, a stationary appliance or a movable appliance, such as a TV, a projector, a cellular phone, a smart phone, a desktop computer, a laptop computer, a digital broadcasting terminal, a personal digital assistant (PDA), a portable multimedia player (PMP), a navigation system, a tablet PC, a wearable device, a set-top box (STB), a DMB receiver, a radio, a washing machine, a refrigerator, a digital signage, a robot, or a vehicle.

Referring to FIG. 1, Terminal 100 may include a communication unit 110, an input unit 120, a learning processor 130, a sensing unit 140, an output unit 150, a memory 170, and a processor 180, for example.

Communication unit 110 may transmit and receive data to and from external devices, such as other AI devices 100a to 100e and an AI server 200, using wired/wireless communication technologies. For example, communication unit 110 may transmit and receive sensor information, user input, learning models, and control signals, for example, to and from external devices.

At this time, the communication technology used by communication unit 110 may be, for example, a global system for mobile communication (GSM), code division multiple Access (CDMA), long term evolution (LTE), 5G, wireless LAN (WLAN), wireless-fidelity (Wi-Fi), Bluetooth™, radio frequency identification (RFID), infrared data association (IrDA), ZigBee, or near field communication (NFC).

Input unit 120 may acquire various types of data.

At this time, input unit 120 may include a camera for the input of an image signal, a microphone for receiving an audio signal, and a user input unit for receiving information input by a user, for example. Here, the camera or the microphone may be handled as a sensor, and a signal acquired from the camera or the microphone may be referred to as sensing data or sensor information.

Input unit 120 may acquire, for example, input data to be used when acquiring an output using learning data for model learning and a learning model. Input unit 120 may acquire unprocessed input data, and in this case, processor 180 or learning processor 130 may extract an input feature as pre-processing for the input data.

Learning processor 130 may cause a model configured with an artificial neural network to learn using the learning data. Here, the learned artificial neural network may be called a learning model. The learning model may be used to deduce a result value for newly input data other than the learning data, and the deduced value may be used as a determination base for performing any operation.

At this time, learning processor 130 may perform AI processing along with a learning processor 240 of AI server 200.

At this time, learning processor 130 may include a memory integrated or embodied in AI device 100. Alternatively, learning processor 130 may be realized using memory 170, an external memory directly coupled to AI device 100, or a memory held in an external device.

Sensing unit 140 may acquire at least one of internal information of AI device 100 and surrounding environmental information and user information of AI device 100 using various sensors.

At this time, the sensors included in sensing unit 140 may be a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar, for example.

Output unit 150 may generate, for example, a visual output, an auditory output, or a tactile output.

At this time, output unit 150 may include, for example, a display that outputs visual information, a speaker that outputs auditory information, and a haptic module that outputs tactile information.

Memory 170 may store data which assists various functions of AI device 100. For example, memory 170 may store input data acquired by input unit 120, learning data, learning models, and learning history, for example.

Processor 180 may determine at least one executable operation of AI device 100 based on information determined or generated using a data analysis algorithm or a machine learning algorithm. Then, processor 180 may control constituent elements of AI device 100 to perform the determined operation.

To this end, processor 180 may request, search, receive, or utilize data of learning processor 130 or memory 170, and may control the constituent elements of AI device 100 so as to execute a predictable operation or an operation that is deemed desirable among the at least one executable operation.

At this time, when connection of an external device is necessary to perform the determined operation, processor 180 may generate a control signal for controlling the external device and may transmit the generated control signal to the external device.

Processor 180 may acquire intention information with respect to user input and may determine a user request based on the acquired intention information.

At this time, processor 180 may acquire intention information corresponding to the user input using at least one of a speech to text (STT) engine for converting voice input into a character string and a natural language processing (NLP) engine for acquiring natural language intention information.

At this time, at least a part of the STT engine and/or the NLP engine may be configured with an artificial neural network learned according to a machine learning algorithm. Then, the STT engine and/or the NLP engine may have learned by learning processor 130, may have learned by learning processor 240 of AI server 200, or may have learned by distributed processing of processors 130 and 240.

Processor 180 may collect history information including, for example, the content of an operation of AI device 100 or feedback of the user with respect to an operation, and may store the collected information in memory 170 or learning processor 130, or may transmit the collected information to an external device such as AI server 200. The collected history information may be used to update a learning model.

Processor 180 may control at least some of the constituent elements of AI device 100 in order to drive an application program stored in memory 170. Moreover, processor 180 may combine and operate two or more of the constituent elements of AI device 100 for the driving of the application program.

Figure 2:
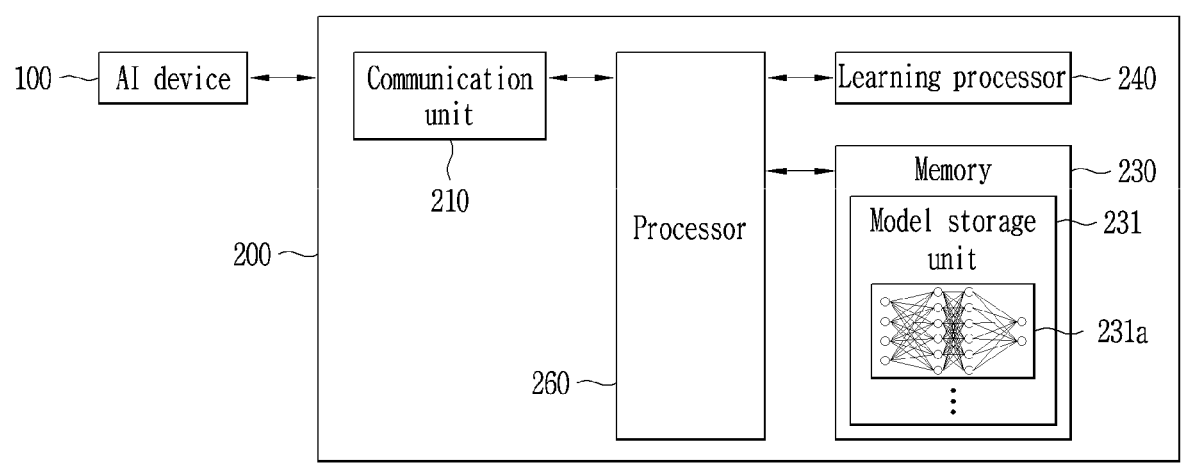
FIG. 2 illustrates an AI server 200 according to an embodiment of the present disclosure.

FIG. 2 illustrates AI server 200 according to an embodiment of the present disclosure.

Referring to FIG. 2, AI server 200 may refer to a device that causes an artificial neural network to learn using a machine learning algorithm or uses the learned artificial neural network. Here, AI server 200 may be constituted of multiple servers to perform distributed processing, and may be defined as a 5G network. At this time, AI server 200 may be included as a constituent element of AI device 100 so as to perform at least a part of AI processing together with AI device 100.

AI server 200 may include a communication unit 210, a memory 230, a learning processor 240, and a processor 260, for example.

Communication unit 210 may transmit and receive data to and from an external device such as AI device 100.

Memory 230 may include a model storage unit 231. Model storage unit 231 may store a model (or an artificial neural network) 231a which is learning or has learned via learning processor 240.

Learning processor 240 may cause artificial neural network 231a to learn learning data. A learning model may be used in the state of being mounted in AI server 200 of the artificial neural network, or may be used in the state of being mounted in an external device such as AI device 100.

The learning model may be realized in hardware, software, or a combination of hardware and software. In the case in which a part or the entirety of the learning model is realized in software, one or more instructions constituting the learning model may be stored in memory 230.

Processor 260 may deduce a result value for newly input data using the learning model, and may generate a response or a control instruction based on the deduced result value.

Figure 3:
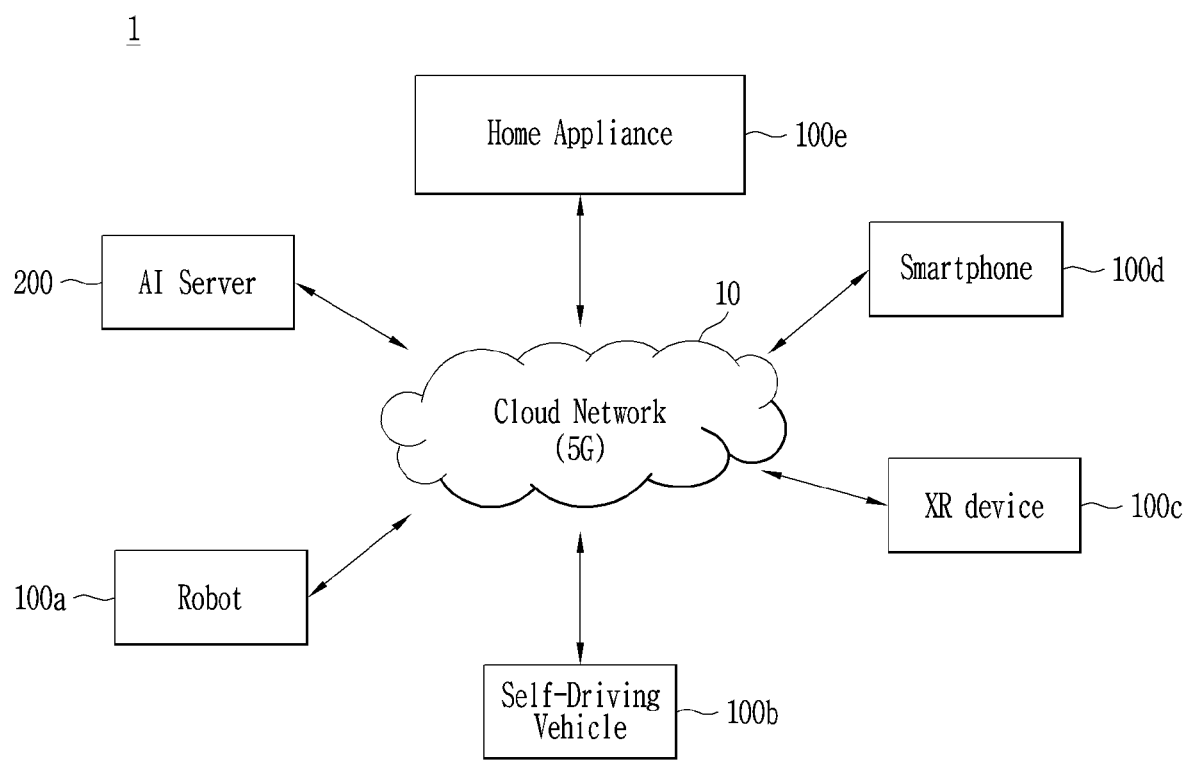
FIG. 3 illustrates an AI system 1 according to an embodiment of the present disclosure.

FIG. 3 illustrates an AI system 1 according to an embodiment of the present disclosure.

Referring to FIG. 3, in AI system 1, at least one of AI server 200, a robot 100a, an autonomous driving vehicle 100b, an XR device 100c, a smart phone 100d, and a home appliance 100e is connected to a cloud network 10. Here, robot 100a, autonomous driving vehicle 100b, XR device 100c, smart phone 100d, and home appliance 100e, to which AI technologies are applied, may be referred to as AI devices 100a to 100e.

Cloud network 10 may constitute a part of a cloud computing infra-structure, or may mean a network present in the cloud computing infra-structure. Here, cloud network 10 may be configured using a 3G network, a 4G or long term evolution (LTE) network, or a 5G network, for example.

That is, respective devices 100a to 100e and 200 constituting AI system 1 may be connected to each other via cloud network 10. In particular, respective devices 100a to 100e and 200 may communicate with each other via a base station, or may perform direct communication without the base station.

AI server 200 may include a server which performs AI processing and a server which performs an operation with respect to big data.

AI server 200 may be connected to at least one of robot 100a, autonomous driving vehicle 100b, XR device 100c, smart phone 100d, and home appliance 100e, which are AI devices constituting AI system 1, via cloud network 10, and may assist at least a part of AI processing of connected AI devices 100a to 100e.

At this time, instead of AI devices 100a to 100e, AI server 200 may cause an artificial neural network to learn according to a machine learning algorithm, and may directly store a learning model or may transmit the learning model to AI devices 100a to 100e.

At this time, AI server 200 may receive input data from AI devices 100a to 100e, may deduce a result value for the received input data using the learning model, and may generate a response or a control instruction based on the deduced result value to transmit the response or the control instruction to AI devices 100a to 100e.

Alternatively, AI devices 100a to 100e may directly deduce a result value with respect to input data using the learning model, and may generate a response or a control instruction based on the deduced result value.

Hereinafter, various embodiments of AI devices 100a to 100e, to which the above-described technology is applied, will be described. Here, AI devices 100a to 100e illustrated in FIG. 3 may be specific embodiments of AI device 100 illustrated in FIG. 1.

Autonomous driving vehicle 100b may be realized into a mobile robot, a vehicle, or an unmanned air vehicle, for example, through the application of AI technologies.

Autonomous driving vehicle 100b may include an autonomous driving control module for controlling an autonomous driving function, and the autonomous driving control module may mean a software module or a chip realized in hardware. The autonomous driving control module may be a constituent element included in autonomous driving vehicle 100b, but may be a separate hardware element outside autonomous driving vehicle 100b so as to be connected to autonomous driving vehicle 100b.

Autonomous driving vehicle 100b may acquire information on the state of autonomous driving vehicle 100b using sensor information acquired from various types of sensors, may detect (recognize) the surrounding environment and an object, may generate map data, may determine a movement route and a driving plan, or may determine an operation.

Here, autonomous driving vehicle 100b may use sensor information acquired from at least one sensor among a lidar, a radar, and a camera in the same manner as robot 100a in order to determine a movement route and a driving plan.

In particular, autonomous driving vehicle 100b may recognize the environment or an object with respect to an area outside the field of vision or an area located at a predetermined distance or more by receiving sensor information from external devices, or may directly receive recognized information from external devices.

Autonomous driving vehicle 100b may perform the above-described operations using a learning model configured with at least one artificial neural network. For example, autonomous driving vehicle 100b may recognize the surrounding environment and the object using the learning model, and may determine a driving line using the recognized surrounding environment information or object information. Here, the learning model may be directly learned in autonomous driving vehicle 100b, or may be learned in an external device such as AI server 200.

At this time, autonomous driving vehicle 100b may generate a result using the learning model to perform an operation, but may transmit sensor information to an external device such as AI server 200 and receive a result generated by the external device to perform an operation.

Autonomous driving vehicle 100b may determine a movement route and a driving plan using at least one of map data, object information detected from sensor information, and object information acquired from an external device, and a drive unit may be controlled to drive autonomous driving vehicle 100b according to the determined movement route and driving plan.

The map data may include object identification information for various objects arranged in a space (e.g., a road) along which autonomous driving vehicle 100b drives. For example, the map data may include object identification information for stationary objects, such as streetlights, rocks, and buildings, and movable objects such as vehicles and pedestrians. Then, the object identification information may include names, types, distances, and locations, for example.

In addition, autonomous driving vehicle 100b may perform an operation or may drive by controlling the drive unit based on user control or interaction. At this time, autonomous driving vehicle 100b may acquire interactional intention information depending on a user operation or voice expression, and may determine a response based on the acquired intention information to perform an operation.

Figure 4:
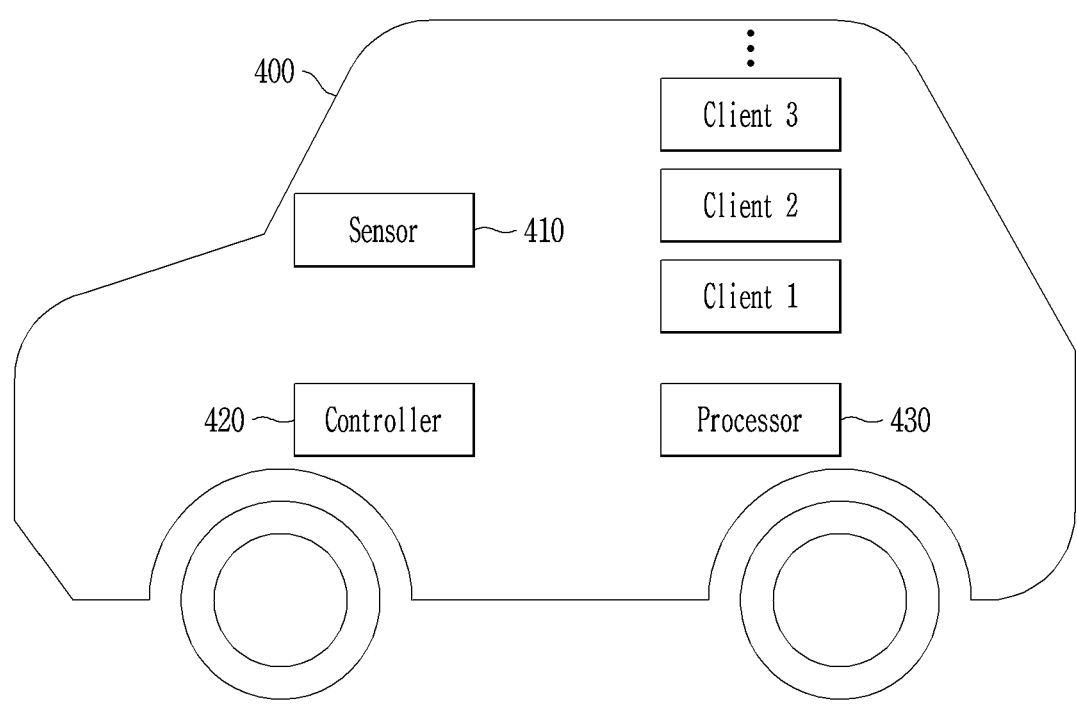
FIG. 4 illustrates a vehicle determining a surrounding condition according to an embodiment of the present disclosure.

FIG. 4 illustrates a vehicle determining a surrounding condition according to an embodiment of the present disclosure;

A vehicle 400 may include a sensor 410, a controller 420, and a processor 430. At this time, sensor 410 may include at least one device embedded in the vehicle. For example, sensor 410 may include a device that senses a surrounding condition of the vehicle, such as a camera, a LIDAR. Accordingly, sensor 410 can acquire image data of the surrounding condition of the vehicle using the camera, or sensor 410 can acquire information on the distance to the surrounding object of the vehicle using the LIDAR.

The client may include a device that is not embedded in vehicle 400 but is connectable with vehicle 400. The client may include, for example, a mobile phone, a cellular phone, a smart phone, a personal computer, a tablet computer, a wearable device, a laptop computer, a netbook, a personal digital assistant (PDA), a digital camera, a personal multimedia player (PMP), or an E-book. At this time, the client may be connected with vehicle 400 via wired/wireless communication. The client may be connected to vehicle 400 via, for example, a wireless communication technology such as 5G communication, wireless LAN (WLAN), wireless-fidelity (WiFi) Direct, Digital Living Network Alliance (DLNA), Wireless broadband (Wibro), World Interoperability for Microwave Access (Wimax), High Speed Downlink Packet Access (HSDPA), Global System for Mobile communication (GSM), Code Division Multiple Access (CDMA), WCDMA, 3GPP Long Term Evolution (LTE), or 3GPP LTE Advanced (LTE-A), or a short-range communication such as Bluetooth™, radio frequency identification (RFID), infrared data association (IrDA), Ultra Wideband (UWB), ZigBee, or near field communication (NFC). Hereinafter, it is assumed that the client and vehicle 400 are connected via 5G wireless communication, but the scope of the present invention is not limited thereto. Specifically, client 1 corresponds to a smart phone, client 2 corresponds to a tablet computer, client 3 corresponds to a digital camera, and each client can be connected to vehicle 400 via 5G communication.

The client can communicate with sensor 410 or controller 420 of vehicle 400 by transmitting and receiving data. Specifically, data sensed by sensor 410 may be transmitted and received between the client and sensor 410 or between the client and controller 420. For example, the image data sensed by sensor 410 may be transmitted and received between the client 1 and sensor 410 or between the client 1 and controller 420, the image data sensed by sensor 410 may be transmitted and received between the client 2 and sensor 410 or between the client 2 and controller 420, or the image data sensed by sensor 410 may be transmitted and received between the client 3 and sensor 410 or between the client 3 and controller 420.

At this time, controller 420 may verify data transmission performance of the client. Here, the performance of the client can be determined in consideration of the transmission delay and the processing time of the client. For example, the performance of each client can be verified in consideration of the transmission delay and the processing time of the client 1, the transmission delay and the processing time of the client 2, and the transmission delay and the processing time of the client 3, respectively.

When the performance is verified in consideration of the transmission delay and the processing time of each client, controller 420 may assign an appropriate algorithm to each client. For example, if the performance is of better quality in the order of the client 2/the client 1/the client 3 considering the transmission delay and the processing time of the client, algorithm B consuming a lot of time may be assigned to the client 2 having relatively good performance, and algorithm C consuming less time may be assigned to the client 3 having relatively poor performance.

Each client can process the data sensed by sensor 410 using the assigned algorithm. Processor 430 can check the surrounding condition of vehicle 400 by integrating the results processed by the respective clients. For example, clients 1 to 3 assigned with the respective algorithms can process the sensed data, and processor 430 can check the surrounding condition of the vehicle based on the processing results of clients 1 to 3. More specifically, processor 430 may determine an object (e.g., a vehicle, a motorcycle, a person, etc.) located in the same lane or a nearby lane in the traveling direction of vehicle 400, and signal information based on the processing results of the respective clients.

According to an embodiment, the algorithm that can be driven in vehicle 400 changes depending on the performance of the embedded module, and, accordingly, the accuracy of the recognition of the surrounding condition by the technology such as ADAS (Advanced Driver Assistance Systems) of vehicle 400 may become low. If the recognition rate of the drivable algorithm is low due to the poor performance of the embedded module in vehicle 400, the reliability of the technology such as the ADAS of vehicle 400 may also be low. At this time, the accuracy of recognition of the surrounding condition by the technology such as ADAS of vehicle 400 can be improved if the connectable clients are used as well as the embedded module in vehicle 400 to integrate the processing results of the clients as well. Here, the ADAS is a technology in which vehicle 400 recognizes, determines, and controls a part of the conditions that may occur during the driving of vehicle 400 by itself.

Figure 5:
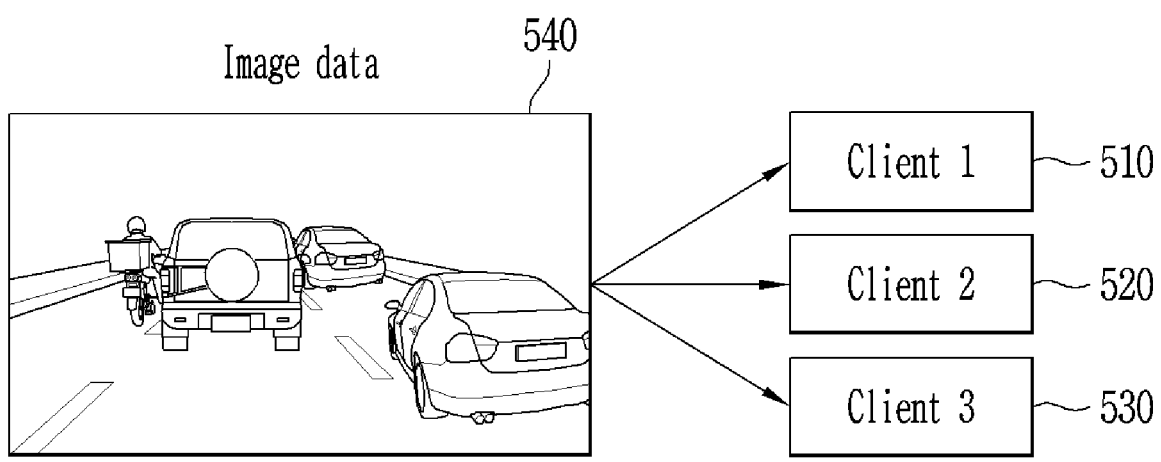
FIG. 5 illustrates processing of image data by an algorithm assigned to a client according to an embodiment of the present disclosure.

FIG. 5 illustrates processing of image data by an algorithm assigned to a client according to an embodiment of the present disclosure.

The vehicle can acquire the sensed data through the sensor. The sensed data may include image data obtained through a camera. The image data may be image data for the forward direction which is the traveling direction of the vehicle or image data for the rear direction of the vehicle, or it may include image data for the side direction of the vehicle.

The vehicle can basically recognize an object such as a vehicle/lane/person included in the image data by an embedded algorithm. Also, the vehicle can recognize a surrounding condition according to the vehicle and the recognized object using the position/speed of the recognized object. If the recognized object is, for example, a person, the vehicle can recognize the surrounding condition, such as a possibility of collision, based on the speed of the vehicle and the distance between the vehicle and the person. Alternatively, if the recognized object is a lane, the vehicle can recognize the surrounding condition, such as a lane departure possibility, based on the interval between the vehicle and the lane.

If the performance of the sensors and algorithms embedded in the vehicle is poor, the reliability of the surrounding condition recognized by the vehicle may be low. Accordingly, the vehicle may identify a connectable client and recognize the surrounding condition of the vehicle by integrating the processing result by the client. Hereinafter, it is described on the basis of an example having three clients, but the scope of rights of the present invention is not limited thereto.

The vehicle can identify connectable clients, which are client 1 510 to client 3 530. At this time, client 1 510 may be a smart phone, client 2 520 may be a tablet computer, and the client 3 530 may be a navigation device. The vehicle can transmit and receive data with the smart phone, which is client 1 510, the tablet computer, which is client 2 520, and the navigation device, which is client 3 530, and determine the performance considering the transmission delay and the processing time of each client. At this time, the vehicle may store a table corresponding to the performance of each client, and the data transmission/reception process can be omitted when using the table instead. If the performances of data transmission/reception are determined in advance for the navigation device of the client 1 and the smart phone of the client 3, the vehicle can determine the performances of respective clients by using the data recorded in the stored table. Also, the vehicle can determine the performance of the client 2 by transmitting/receiving data to/from the tablet computer, which is the client 2 with no record in the table. At this time, the record related to the client 2 may be updated and stored in the table.

The vehicle can assign a different algorithm to each client based on the determined performance of each client. For example, if performance is of better quality in the order of the client 2/the client 1/the client 3, the vehicle can assign algorithm B, which consumes a relatively long time for algorithm operation, to the client 2, and algorithm C, which consumes a relatively short time for algorithm operation, can be assigned to the client 3.

Image data 540, which is an example of data sensed by a vehicle sensor, may be transmitted to each client to which each algorithm is assigned. At this time, image data 540 transmitted to each client may be the same image data or different image data. That is, when there are multiple sensors embedded in the vehicle, the image data may be different from each other. At this time, the vehicle can check the difference between the image data obtained by the different sensors in advance. If the number of image data obtained by different sensors is smaller than the number of clients, the main image data can be transmitted to more than one client. For example, the same image data acquired by the same sensor embedded in the vehicle can be transmitted to the client 1, the client 2, and the client 3, and the vehicle can determine the surrounding condition based on the processing results of the same image data by respective clients 1 to 3. As another example, when two different image data are acquired by different sensors embedded in the vehicle, the main image data can be transmitted to the client 2/the client 1 having relatively high performances, and the sub-image data can be transmitted to the client 3 whose performance is relatively poor. At this time, the vehicle can check the difference between the main image data and the sub-image data in advance and reflect the difference when determining the surrounding condition.

The client receiving the image data can recognize the object and/or the surrounding condition from the image data based on the assigned algorithm. For example, client 1 510 can recognize one truck on the same lane, two cars on the right side lane, and one motorcycle on the left side lane from the image data. Further, client 2 520 can recognize one truck on the same lane, two cars from the right side lane, and zero motorcycles from the left side lane from the image data. Further, client 3 530 can recognize one truck on the same lane, two cars on the right side lane, and one motorcycle on the left side lane from the image data. Here, the truck, car, and motorcycle are examples of objects recognized through the image data. The vehicle can recognize the surrounding condition, such as the possibility of collision between the vehicle and the recognized object, based on the position and/or speed of the recognized object.

Figure 6:
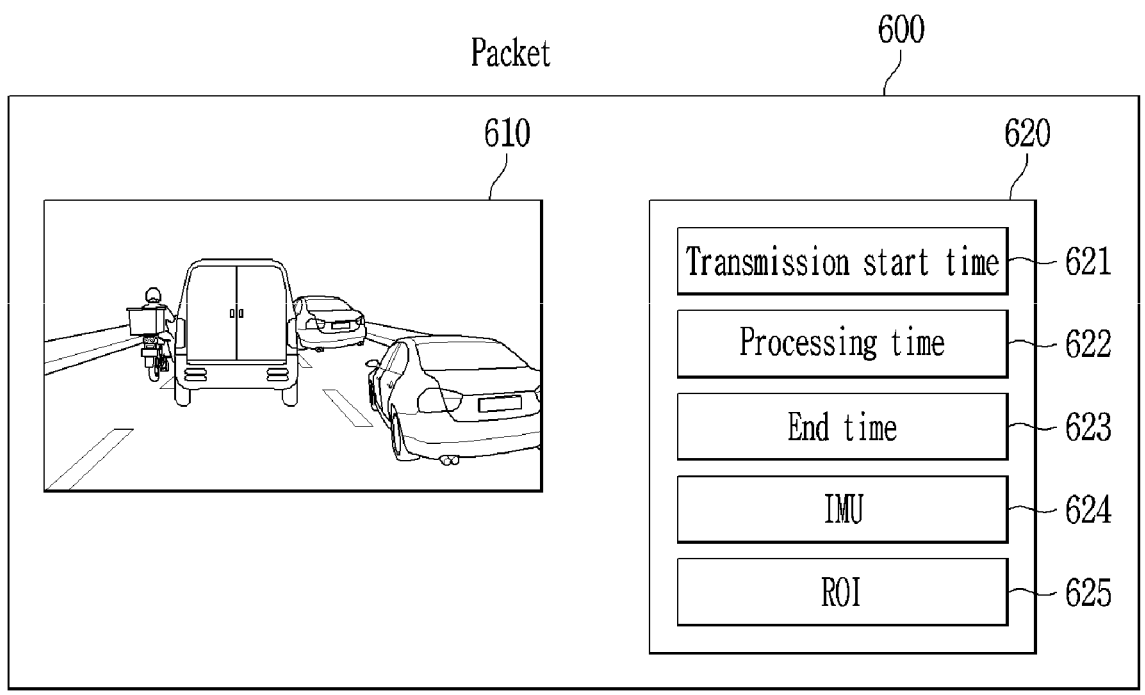
FIG. 6 illustrates a packet used when performance of a client is determined according to an embodiment of the present disclosure.

FIG. 6 illustrates a packet used when performance of a client is determined according to an embodiment of the present disclosure.

A sensor and a client, or a controller and the client can send and receive a packet 600, which is data, and the performance of the client can be checked based on the transmission/reception result of packet 600.

Packet 600 may include sensed data (e.g., image data 610) and a header 620. Here, header 620 may include transmission start time 621. Transmission start time 621 may indicate the time at which transmission of the packet from the sensor or the controller to the client begins. In addition, header 620 may include processing time 622. Processing time 622 is different for each client, and processing time 622 may indicate the time consumed when the client recognizes the object contained in image data 610. End time 623 may be determined in consideration of the transmission delay and the processing time after the packet is transmitted to the client. That is, end time 623 may be the time obtained by adding the transmission start time, transmission delay, and processing time.

In addition, an inertial measurement unit (IMU) 624 represents information related to the object recognized from image data 610. Here, the information related to the object may include an X coordinate, a Y coordinate, a width, and a height of the object in image data 610 as well as a variation amount (e.g., speed) based thereon.

Also, a region of interest (ROI) may be a region allocated by the controller. Specifically, the ROI may be a region related to the traveling direction of the vehicle in image data 610. For example, the ROI may be a forward region related to the same lane direction of the vehicle in image data 610. Alternatively, the ROI may be a region in which respective clients present different recognition results for image data 610. For example, if the respective clients bring out different recognition results for the motorcycle in the left side lane of the vehicle, that region may be set as the ROI. Also, in an embodiment, the ROI may be determined based on at least one of the traveling speed of the vehicle, the driving information, and the route guidance information.

According to an embodiment, algorithms to be assigned to respective clients may be determined based on the transmission/reception result of packet 600. For example, as a result of the transmission and reception of packet 600, the processing time of the client 1 may be 20 msec without any transmission delay, and the processing time of the client 2 may be 10 msec with the transmission delay of 2 msec. At this time, the controller may determine that the performance of the client 2 is better than the performance of the client 1, and allocate algorithm B with a relatively large amount of computation to the client 2 and algorithm A with a relatively small amount of computation to the client 1.

Figure 7:
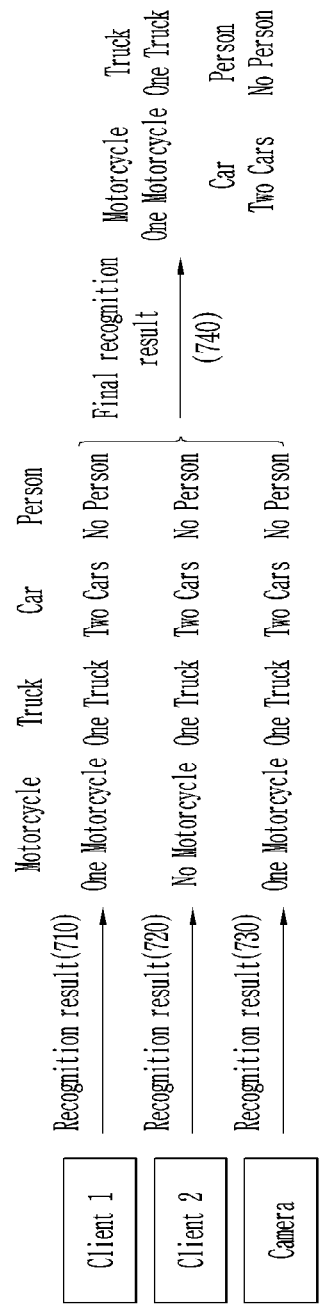
FIG. 7 illustrates recognizing a surrounding condition by a vehicle and a client according to an embodiment of the present disclosure.

FIG. 7 illustrates recognizing a surrounding condition by a vehicle and a client according to an embodiment of the present disclosure. It is assumed that the performances of the client 1 and the client 2 are determined through the process of FIG. 6, and algorithm A and algorithm B corresponding to the respective clients are assigned accordingly.

Here, each algorithm may have different recognition rate for each object appeared in the image data as shown in Table 1 below. Fast R-CNN, SSD 512, and ResNet are mere examples of algorithm for recognizing an object from image data, and the algorithm applicable to the present invention is not limited thereto. As shown in Table 1, the object recognition rate is different for each algorithm, and even if the overall average recognition rate is high, the recognition rate may not be high for all objects. Since the algorithm recognizes objects from image data using various formats such as gray, rgb, and hsv, the recognition rate of objects may differ depending on the format used. For example, Table 1 shows that the SSD512 algorithm has the best recognition rate for the object person, and the Resnet algorithm has the best recognition rate for the object Motorcycle.

TABLE 1

|  | Bicycle | Bird | Bus | Car | Motorcycle | Person |
| --- | --- | --- | --- | --- | --- | --- |
| Fast R-CNN | 78.4 | 70.8 | 77.8 | 71.6 | 80.8 | 72.0 |
| SSD512 | 82.3 | 75.8 | 81.7 | 81.5 | 84.3 | 83.3 |
| ResNet | 81.6 | 77.2 | 78.6 | 76.6 | 84.8 | 80.7 |

Recognition result 710 of the image data processed by the client 1 to which algorithm A is assigned can be one motorcycle in the left side lane, one truck in the same lane, two cars in the right side lane, and no person. Also, recognition result 720 of the image data processed by the client 2 to which algorithm B is assigned can be no motorcycle in the left side lane, one truck in the same lane, two cars in the right side lane, and no person. Further, recognition result 730 of the image data by the basic algorithm embedded in the vehicle may be one motorcycle in the left side lane, one truck in the same lane, two cars in the right side lane, and no person. At this time, since the object recognition rates of respective algorithms may be different as shown in Table 1, the results for the objects recognized from the image data may be different. Accordingly, the client 1 determined that there is one motorcycle in the left side lane, and the client 2 determined that there is no motorcycle in the left side lane, and the vehicle determined that there is one motorcycle in the left side lane.

At this time, the vehicle can set a region showing different recognition results as an ROI. The vehicle can determine a final recognition result 740 by integrating the recognition results from different algorithms with respect to the ROI. For example, the vehicle may set the left side lane region showing different recognition results as the ROI, and the vehicle integrates the recognition results from different algorithms with respect to the ROI to derive final recognition result 740, which is one motorcycle in the left side lane, one truck in the same lane, two cars in the right side lane, and no person. Also, the vehicle can determine final recognition result 740 by reflecting a weight on the result of the algorithm with a relatively high recognition rate for the object in the ROI. For example, the vehicle may set the left side lane region showing different recognition results as the ROI, and the vehicle may apply a weight to recognition result 710 of algorithm A having a high recognition rate for the motorcycle to derive final recognition result 740, which includes one motorcycle in the left side lane, one truck in the same lane, two cars in the right side lane, and no person.

Figure 8:
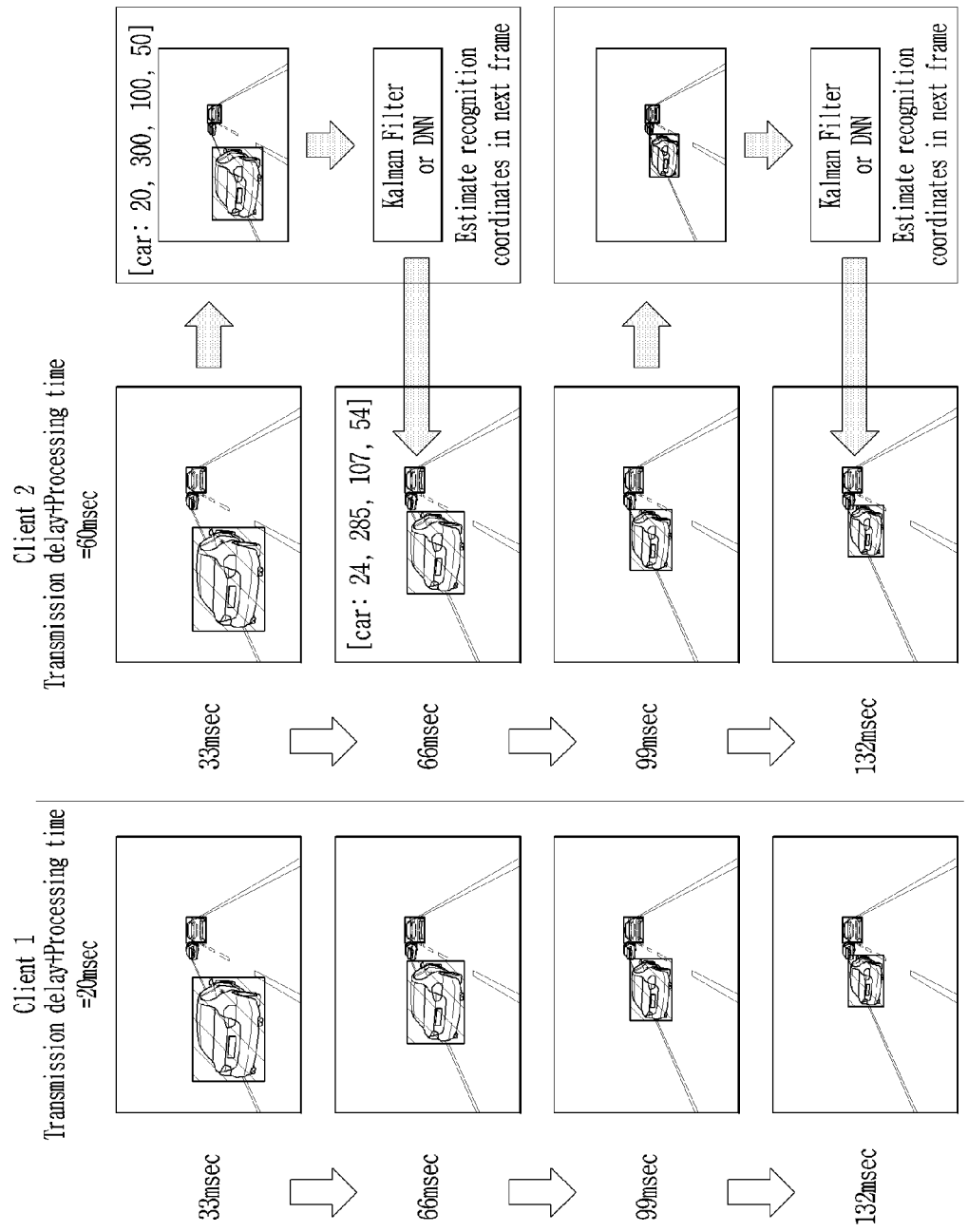
FIG. 8 illustrates recognizing a surrounding condition by a vehicle and a client according to another embodiment of the present disclosure.

FIG. 8 illustrates recognizing a surrounding condition by a vehicle and a client according to another embodiment of the present disclosure.

The sensing period of the vehicle sensor can be determined according to the performance of the sensor. For example, if the sensor is capable of sensing an image at a cycle of 33 msec, the sensor can sense the image at 33 msec, 66 msec, 99 msec, and 132 msec. That is, the sensor senses image data 1 at 33 msec, senses image data 2 at 66 msec, senses image data 3 at 99 msec, and senses image data 4 at 132 msec. In this embodiment, the sensing period is an example only, and other values may be applied based on the relative relationship of the specific values.

The surrounding condition of the vehicle can be determined based on the recognition result of the image data by the client without correction if the sum of the transmission delay and the processing time of the client is shorter than the sensing period of the sensor. For example, when the sum of the transmission delay and the processing time of the tablet computer, which is the client 1, is 20 msec and the sensing period of the sensor is 33 msec, the vehicle can determine the surrounding condition of the vehicle based on the recognition result of the image data by the client without correction.

If the sum of the transmission delay and the processing time of the client is longer than the sensing period of the sensor, the recognition result of the image data by the client may be corrected to determine the surrounding condition of the vehicle. For example, when the sum of the transmission delay and the processing time of the smart phone, which is the client 2, is 60 msec and the sensing period of the sensor is 33 msec, the vehicle can check the recognition result of image data 1 processed by the smart phone at 93 msec, the recognition result of image data 2 processed by the smart phone at 126 msec, and the recognition result of image data 3 processed by the smart phone at 159 msec. Therefore, the vehicle can estimate the recognition result of the smart phone with respect to image data 2 based on the recognition result of the smart phone with respect to image data 1. Specifically, the vehicle can estimate information related to the object included in image data 2 based on the X coordinate, the Y coordinate, the width, the height, and/or the rate of change of the object included in the recognition result of the smart phone with respect to image data 1. For example, X coordinate 24, Y coordinate 285, width 107, and height 54 of the vehicle in the left side lane included in image data 2 can be estimated based on X coordinate 20, Y coordinate 300, width 100, height 50, and/or the rate of change of the object included in the recognition result of the smart phone for image data 1. At this time, the recognition result of the client with respect to the image data may be corrected by application of a filter or a neural network. For example, a Kalman filter can be applied as a filter, and a deep neural network can be applied as a neural network. In this manner, when the performance of the client is less than or equal to the sensing period, the vehicle can estimate the object by correcting the recognition result of the client with respect to the image data, and the surrounding condition of the vehicle can be determined by reflecting the estimated result.

Figure 9:
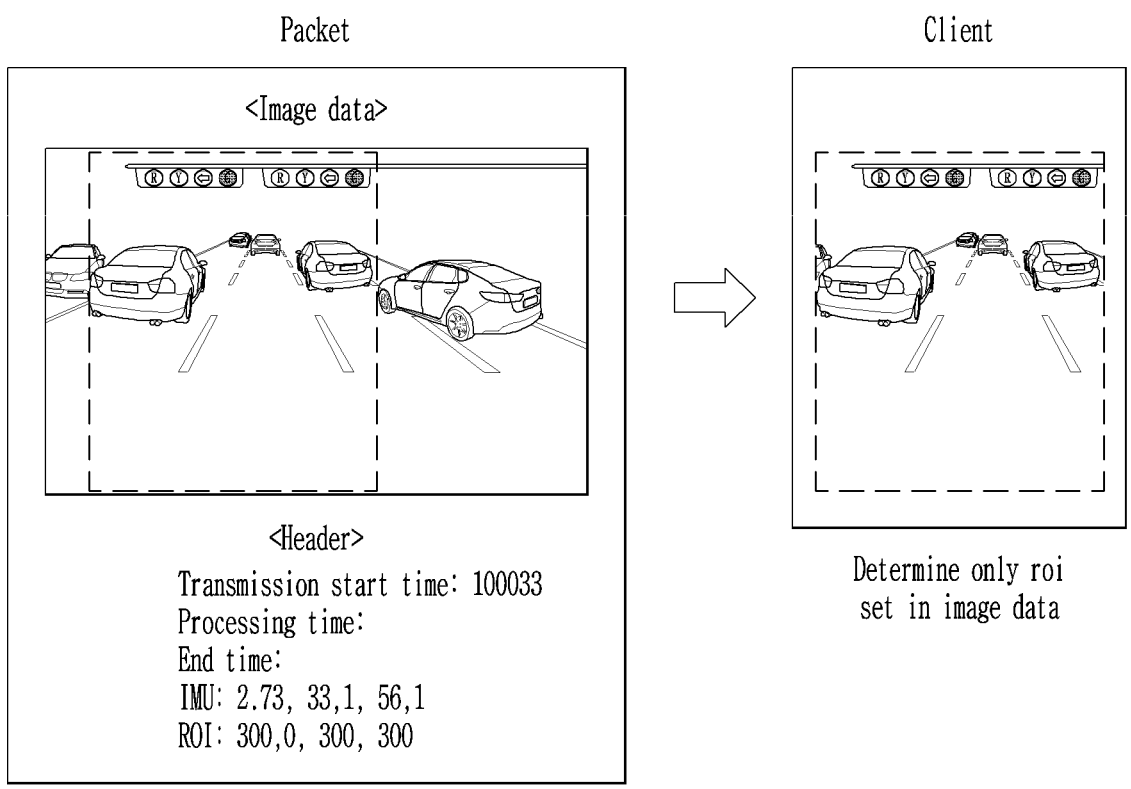
FIG. 9 illustrates recognizing a surrounding condition by a vehicle and a client according to another embodiment of the present disclosure.

FIG. 9 illustrates recognizing a surrounding condition by a vehicle and a client according to another embodiment of the present disclosure;

The vehicle can set an ROI if the performance of the client is less than a predetermined threshold (e.g., a sensing period). That is, if the performance of the client is less than the predetermined threshold considering the transmission delay and/or the processing time of the client, the vehicle may request the client to process the ROI, which is a part of the image data, instead of the whole image data. At this time, the performance of the client for the ROI, which is a part of the image data, may be higher than the predetermined threshold. Accordingly, the processing time of the smart phone with respect to the image data can be reduced. For example, if it is determined that the performance of a smart phone as a client is below the predetermined threshold, the vehicle can set a region related to the traveling direction of the vehicle as the ROI and the smart phone can recognize an object in the ROI, which is not all of the image data, based on the assigned algorithm. That is, the smart phone can recognize information related to the vehicle and/or signal information in the left side lane/the same lane/the right side lane with respect to the region related to the traveling direction of the vehicle.

Further, when the performances of multiple clients are equal to or less than the predetermined threshold, the vehicle can set multiple ROIs. The vehicle can set ROI 1 and ROI 2 for the image data. The client 1 may be requested to process for ROI 1, and the client 2 may be requested to process for ROI 2. For example, a region related to the left side lane/the same lane/the right side lane in the traveling direction of the vehicle can be set as ROI 1, a region related to the second lane to the right of the vehicle's traveling direction and a region where the traffic light is displayed may be set as ROI 2. Accordingly, the client 1 can recognize an object included in ROI 1 related to the left side lane/the same lane/the right side lane in front of the vehicle, and the client 2 can recognize an object included in ROI 2 related to the second lane to the right/traffic light.

According to an embodiment, even if the performance of the client is less than the predetermined threshold, the vehicle can set an ROI and determine the surrounding condition based on the recognition result of the client for that region.

Figure 10:
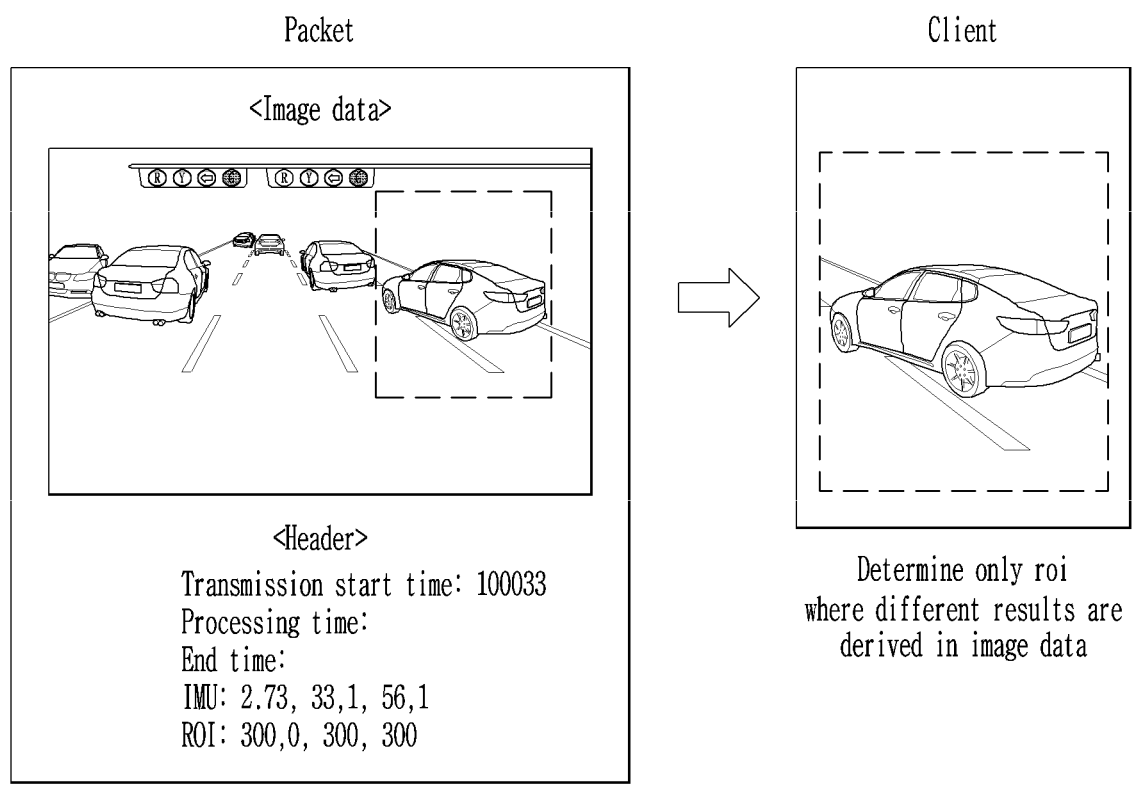
FIG. 10 illustrates recognizing a surrounding condition by a vehicle and a client according to another embodiment of the present disclosure.

FIG. 10 illustrates recognizing a surrounding condition by a vehicle and a client according to another embodiment of the present disclosure.

When clients connected to the vehicle derive different recognition results, the vehicle can set the corresponding region as the ROI. At this time, the ROI is not the whole area of the image data but a part of it, which reduces the time required for the client to process the ROI and improves the recognition rate for the object. For example, when it is determined that there is a car in the second lane to the right by the client 1, the client 2 may determine that there is no car in the second lane to the right. Then, the second lane to the right where different recognition results are derived can be set as the ROI.

The vehicle may send information indicating the location of the ROI and/or the location of the object from which different results are derived to the client 1 and/or the client 2. Then, the client 1 or the client 2 may once again derive the recognition result for the region set as the ROI and the position of the object. The vehicle can determine whether or not there is a car in the second lane to the right on the basis of the recognition result processed again.

Alternatively, the vehicle may transmit information indicating the location of the ROI and/or the location of the object from which different results are derived to the client 3 other than the client 1 or the client 2. The client 3 can derive the recognition result for the region set as the ROI and the position of the object. Based on the recognition result processed by the client 3, the vehicle can determine whether or not there is a car in the second lane to the right.

Figure 11:
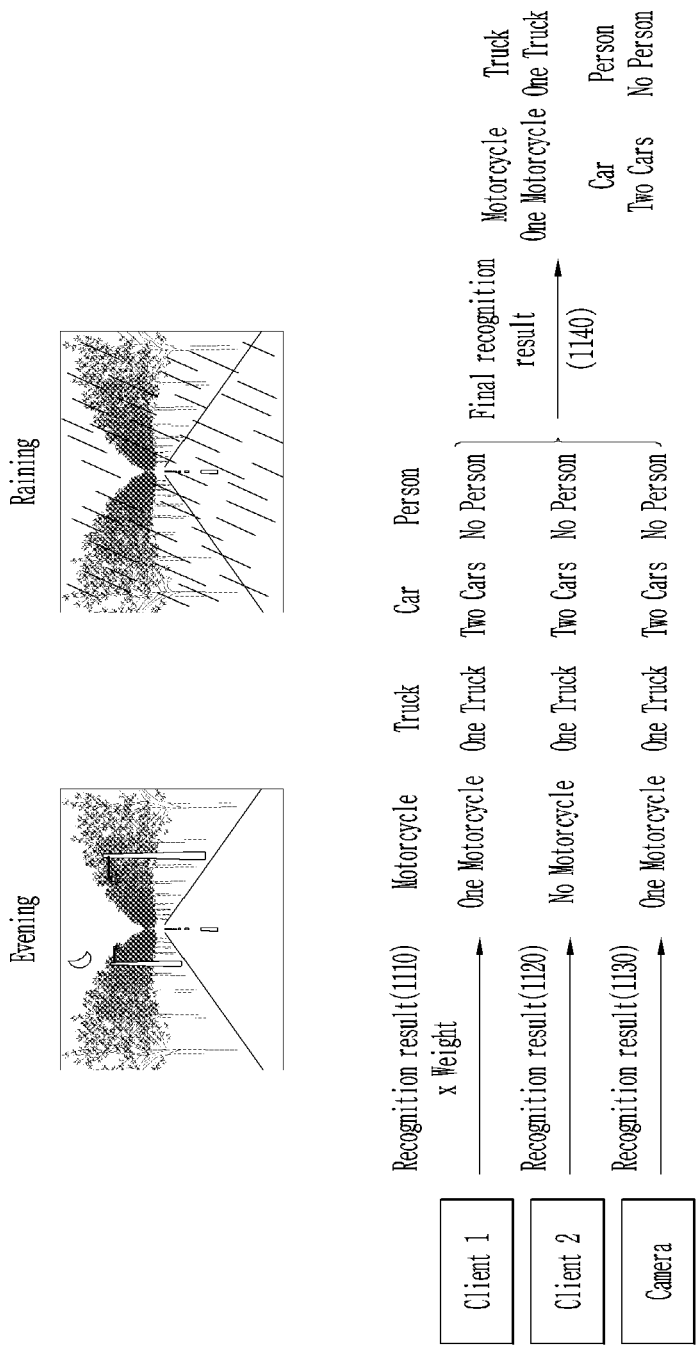
FIG. 11 illustrates recognizing a surrounding condition by a vehicle and a client according to another embodiment of the present disclosure.

FIG. 11 illustrates recognizing a surrounding condition by a vehicle and a client according to another embodiment of the present disclosure.

The algorithms assigned to the clients may have different recognition rates for object depending on the environment around the vehicle. Here, the environment around the vehicle includes, for example, such as day/evening/snow/rain, but the scope of rights of the present invention is not limited thereto. For example, algorithm A may have a relatively high recognition rate for object when the environment around the vehicle is in the evening. In addition, algorithm B may have a relatively high recognition rate for object when the environment around the vehicle is in the rain. In addition, algorithm C may have a relatively high recognition rate for object when the environment around the vehicle is in the snow. Also, algorithm D may have a relatively high recognition rate for object when the environment around the vehicle is during the day.

Specifically, when the sensor of the vehicle senses the environment by sensing the illuminance/rain/snow, the vehicle can prioritize the algorithm suitable for the environment among the multiple algorithms and assign them to the clients. For example, when the environment around the vehicle is in the rain, the vehicle can assign the algorithm to the client in the order that the recognition rate for object is relatively high when it is raining.

The vehicle can determine the surrounding condition of the vehicle based on recognition results processed by respective clients. At this time, if the recognition results are different, the vehicle can determine the surrounding condition by applying a weight to the recognition result of the algorithm suitable for the environment. That is, a relatively high reliability can be given to the recognition result in which the weight is applied.

It is assumed, for example, that algorithm A is assigned to the client 1, algorithm B is assigned to the client 2, and the environment around the vehicle is 12 o'clock at night with low illumination. At this time, the recognition rate for object of algorithm A may be higher than that of algorithm B at a night with low illumination. The client 1 may derive a recognition result 1110, which includes one motorcycle, one truck, two cars, and no person. Also, the client 2 may derive a recognition result 1120, which includes no motorcycle, one truck, two cars, and no person. Further, one motorcycle, one truck, two cars, and no person can be derived as a recognition result 1130 by the algorithm embedded in the vehicle. At this time, the vehicle may weight recognition result 1110 of the client 1 to derive a final recognition result 1140 with one motorcycle, one truck, two cars, and no person.

At this time, the weight can be determined based on the difference of the recognition rates for object between the applied algorithms. The recognition rates for object of the algorithms can be determined in advance, and the vehicle can determine the weight based on the predetermined data.

FIG. 12 illustrates a flowchart of a method of determining a surrounding condition of a vehicle performed by the vehicle.

In step 1210, the vehicle can identify at least one connectable client within the vehicle. Clients such as a smart phone and a tablet computer that can be connected to the vehicle via wired/wireless communication within the vehicle can be identified. At this time, information related to the client which has previously been connected to the vehicle may be stored in advance.

In step 1220, the vehicle may communicate with the identified client to verify the performance of the client based on the determination criterion of the performance of the client. In the process of transmitting and receiving a packet to/from the client, the vehicle can determine the transmission delay and the processing time of the client. The step of determining the performance according to the communication may be omitted if the client has previously been connected to the vehicle.

In step 1230, the vehicle may assign an algorithm corresponding to the client based on the performance of the identified client. At this time, the vehicle can assign algorithms to all of the connectable clients, or only to the selected clients among the connectable clients. Here, the algorithm may have a different recognition rate for each object appearing in the image data.

In step 1240, in the case of acquiring image data through a sensor of the vehicle, a surrounding condition of the vehicle is determined based on the information obtained from the client as a result of processing the image data according to the algorithm. The vehicle can acquire the image data based on a sensing period determined according to the performance of the sensor. When the sensor senses an image, for example, at a cycle of 33 msec, the image can be acquired at 33 msec, 66 msec, 99 msec, and 132 msec. At this time, the surrounding condition of the vehicle can be determined based on the recognition result by the client which has received the image data obtained through the sensor of the vehicle. If the recognition results are different for respective clients, the vehicle can determine the surrounding condition of the vehicle by integrating recognition results from the different algorithms or recognition results from the same algorithm with respect to the ROI. At this time, the ROI may include a region where the recognition results are different in the image data, and the processing speed and/or the recognition rate may be improved due to the processing for the ROI by respective clients. Alternatively, a weight can be applied to the processing result of the algorithm suitable for the environment around the vehicle to determine the surrounding condition of the vehicle. For example, Algorithm A may have a relatively high recognition rate for object in the evening, Algorithm B may have a relatively high recognition rate for object when it is raining, and Algorithm C may have a relatively high recognition rate for object when it is snowing. Accordingly, a weight may be applied to the processing result of the algorithm suitable for the environment around the vehicle so that the surrounding condition of the vehicle is determined. In addition, when the sum of the transmission delay and the processing time of the client is longer than the sensing period of the vehicle sensor, the vehicle can determine the surrounding condition of the vehicle by correcting the recognition result of the image data. For example, when the sum of the transmission delay and the processing time, which is a determination criterion of the performance, is 40 msec and the sensing period of the sensor is 33 msec, the vehicle can determine the surrounding condition of the vehicle by correcting the recognition result of the image data. For a detailed description of each embodiment, reference is made to the above description.

According to an embodiment, the types of algorithms that can be driven can be different according to the performance of ADAS (Advanced Driver Assistance System) module mounted on the vehicle. Or, the types of algorithms that can be driven may be limited if the performance of the pre-installed ADAS module is poor. Accordingly, the image data is recognized by the algorithm assigned to the client, which is connectable to the vehicle, as well as the algorithm of the hardware mounted on the vehicle, so that the surrounding condition of the vehicle can be determined more accurately.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of checking a surrounding condition of a vehicle, the method comprising:
 identifying at least one connectable client in the vehicle;
 communicating with the identified client to verify performance of the client based on a determination criterion of the performance of the client;
 assigning an algorithm corresponding to the client based on the verified performance of the client; and
 checking a surrounding condition of the vehicle based on information obtained from the client as a result of processing image data according to the algorithm in the case of acquiring the image data through a sensor of the vehicle.

2. The method of claim 1, wherein the checking the surrounding condition comprises transmitting the acquired image data to the client and checking the surrounding condition of the vehicle based on a recognition result of the image data by the algorithm assigned to the client.

3. The method of claim 2, wherein the checking the surrounding condition comprises checking, if the recognition results of the image data by a plurality of algorithms are different from each other, the surrounding condition of the vehicle in further consideration of a recognition result by an algorithm other than the plurality of algorithms for a region of interest in the image data.

4. The method of claim 3, wherein the plurality of algorithms have different recognition rates for identifying an object appeared in the image data.

5. The method of claim 3, wherein the region of interest includes a region where the recognition results of the image data by the plurality of algorithms are different from each other.

6. The method of claim 1, wherein the determination criterion of the performance of the client includes at least one of a transmission delay and a processing time of the client.

7. The method of claim 6, wherein the checking the surrounding condition comprises checking, if a sum of the transmission delay and the processing time of the client is longer than a sensing period, the surrounding condition of the vehicle by correcting the recognition result of the image data.

8. The method of claim 6, wherein the checking the surrounding condition comprises:
transmitting information on a region of interest to the client if the performance of the client is equal to or less than a predetermined threshold; and
checking the surrounding condition of the vehicle based on a recognition result of the algorithm corresponding to the client for the region of interest in the image data transmitted to the client.

9. The method of claim 8, wherein the region of interest is determined based on a traveling direction of the vehicle in the image data.

10. The method of claim 1, wherein the checking the surrounding condition comprises checking the surrounding condition of the vehicle by applying a weight corresponding to the algorithm to a processing result of the algorithm suitable for an environment around the vehicle.

11. A non transitory computer readable storage medium that stores an instruction for executing the method of claim 1 on a computer.

12. A vehicle comprising:
a sensor configured to acquire image data;
a controller configured to assign a corresponding algorithm to a client based on performance of the client verified based on a determination criterion according to a communication performed with the client in the vehicle; and
a processor configured to check a surrounding condition of the vehicle based on information obtained from the client as a result of processing the image data acquired through the sensor according to the algorithm.

13. The vehicle of claim 12, wherein, if the image data acquired through the sensor of the vehicle is transmitted to the client, the processor checks the surrounding condition of the vehicle based on a recognition result of the image data by the algorithm of the client.

14. The vehicle of claim 13, wherein, if the recognition results of the image data by a plurality of algorithms are different from each other, the processor checks the surrounding condition of the vehicle in further consideration of a recognition result by an algorithm other than the plurality of algorithms for a region of interest in the image data.

15. The vehicle of claim 14, wherein the plurality of algorithms have different recognition rates for identifying an object appeared in the image data.

16. The vehicle of claim 14, wherein the region of interest includes a region where the recognition results of the image data by the plurality of algorithms are different from each other.

17. The vehicle of claim 12, wherein the determination criterion of the performance of the client includes at least one of a transmission delay and a processing time of the client.

18. The vehicle of claim 17, wherein the processor checks, if a sum of the transmission delay and the processing time of the client is longer than a sensing period, the surrounding condition of the vehicle by correcting the recognition result of the image data.

19. The vehicle of claim 17, wherein the processor checks, if the performance of the client is equal to or less than a predetermined threshold, the surrounding condition of the vehicle based on a recognition result of the algorithm corresponding to the client for the region of interest in the image data transmitted to the client.

20. The vehicle of claim 12, wherein the processor checks the surrounding condition of the vehicle by applying a weight corresponding to the algorithm to a processing result of the algorithm suitable for an environment around the vehicle.

* * * * *